A. H. ANDERSON AND R. T. BRACKETT.
DRAFT INSTRUMENT AND THE LIKE.
APPLICATION FILED JAN. 11, 1919.

1,369,314.

Patented Feb. 22, 1921.
5 SHEETS—SHEET 1.

INVENTOR
Arthur H. Anderson
Ralph T. Brackett
BY
ATTORNEY

A. H. ANDERSON AND R. T. BRACKETT.
DRAFT INSTRUMENT AND THE LIKE.
APPLICATION FILED JAN. 11, 1919.
1,369,314.
Patented Feb. 22, 1921.
5 SHEETS—SHEET 2.
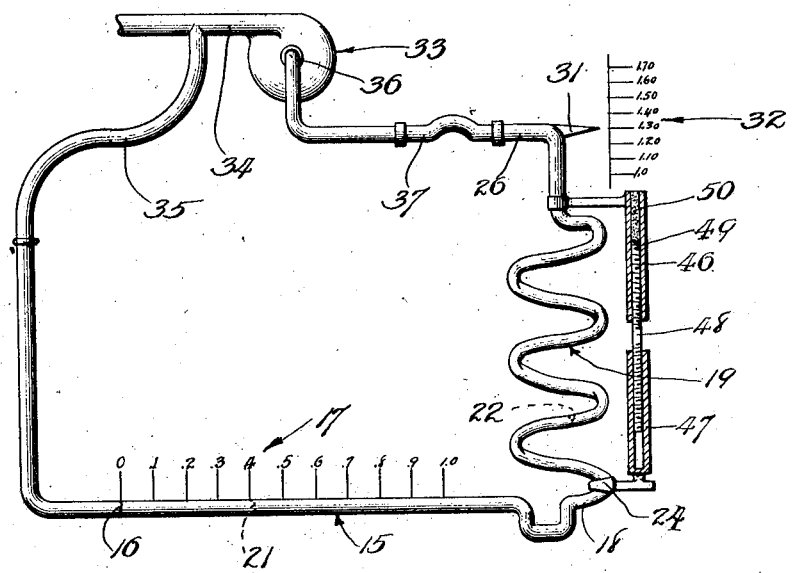
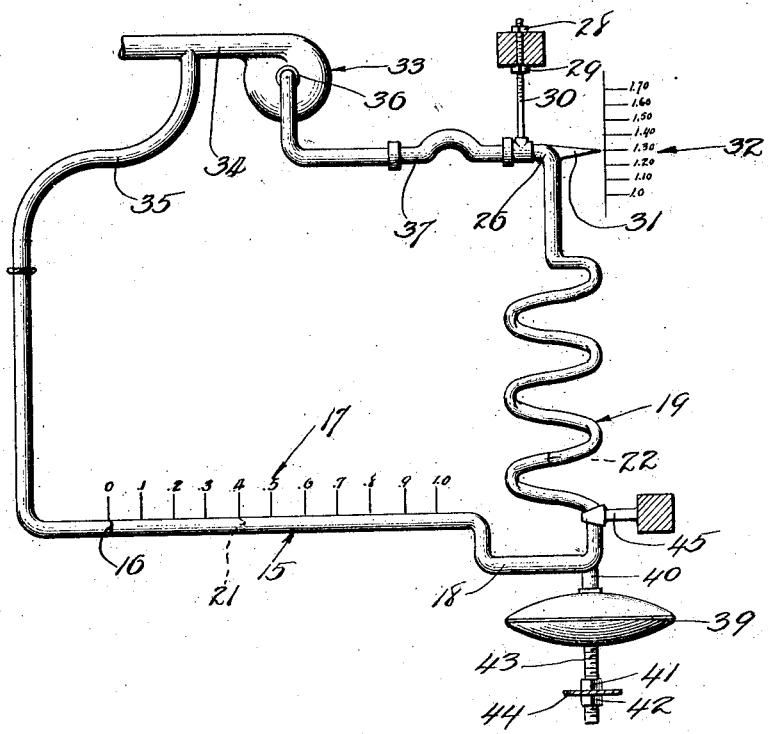
INVENTORS
Arthur H. Anderson
Ralph T. Brackett
BY
ATTORNEY A. H. ANDERSON AND R. T. BRACKETT.
DRAFT INSTRUMENT AND THE LIKE.
APPLICATION FILED JAN. 11, 1919.
1,369,314.
Patented Feb. 22, 1921.
5 SHEETS—SHEET 3.
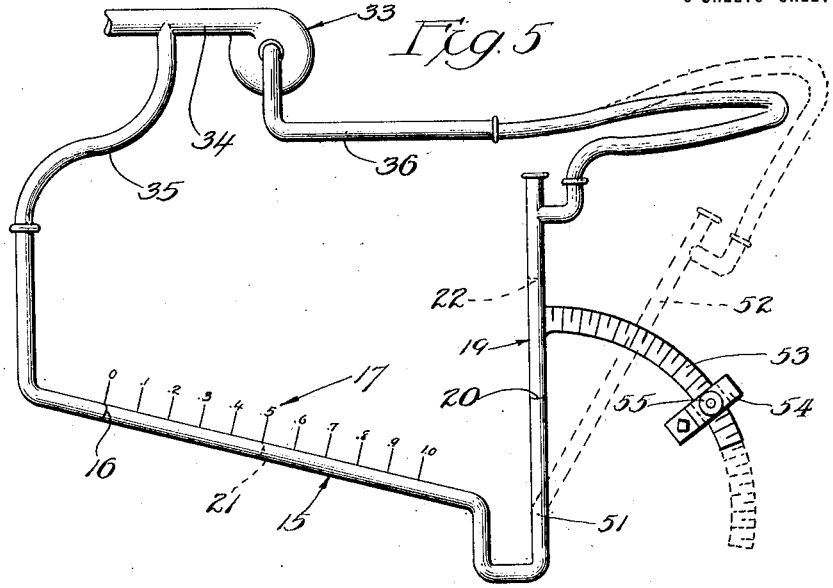
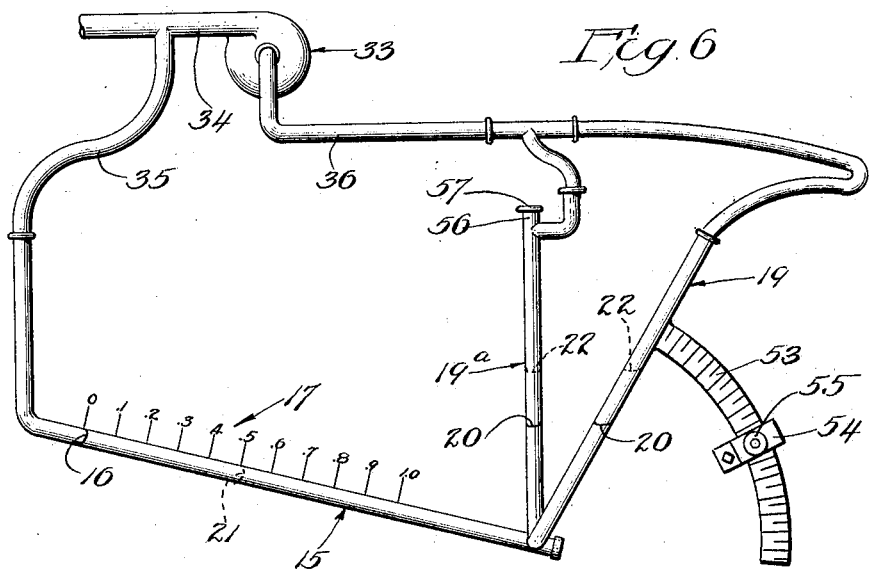
INVENTOR
Arthur H. Anderson
Ralph T. Brackett
BY
ATTORNEY A. H. ANDERSON AND R. T. BRACKETT
DRAFT INSTRUMENT AND THE LIKE.
APPLICATION FILED JAN. 11, 1919.
1,369,314.
Patented Feb. 22, 1921.
5 SHEETS—SHEET 4.
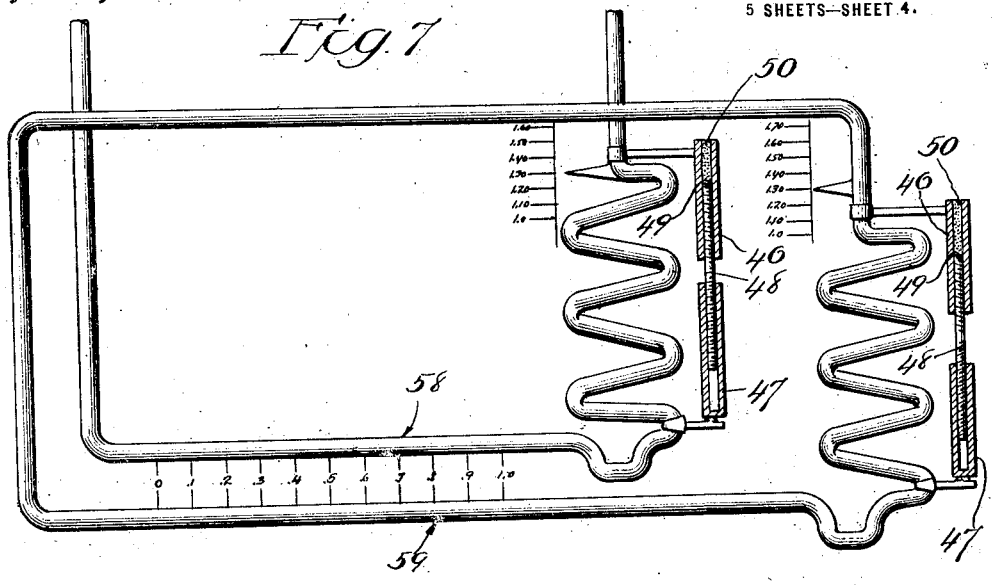
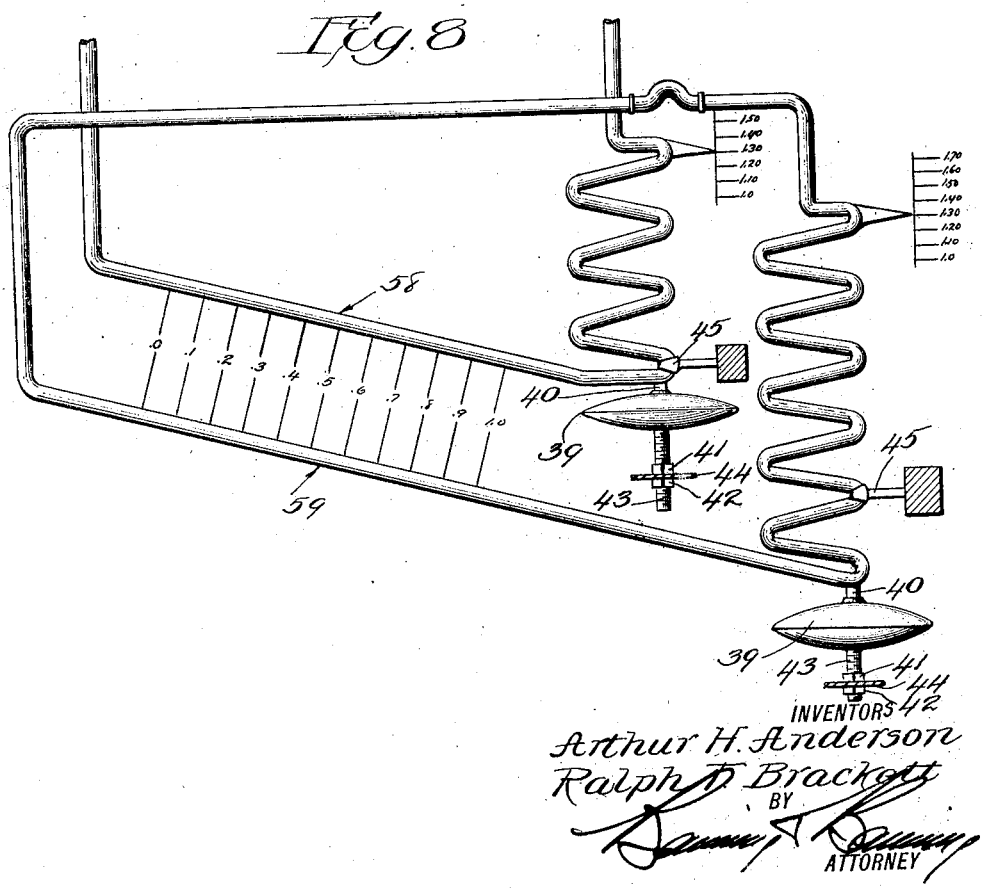
INVENTORS
Arthur H. Anderson
Ralph T. Brackett
BY
ATTORNEY A. H. ANDERSON AND R. T. BRACKETT.
DRAFT INSTRUMENT AND THE LIKE.
APPLICATION FILED JAN. 11, 1919.
1,369,314.
Patented Feb. 22, 1921.
5 SHEETS—SHEET 5.
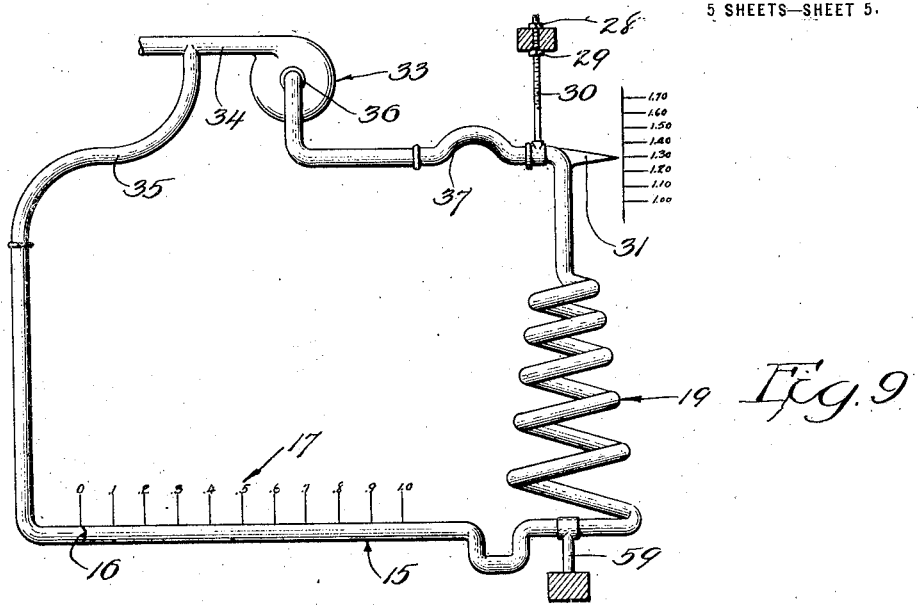
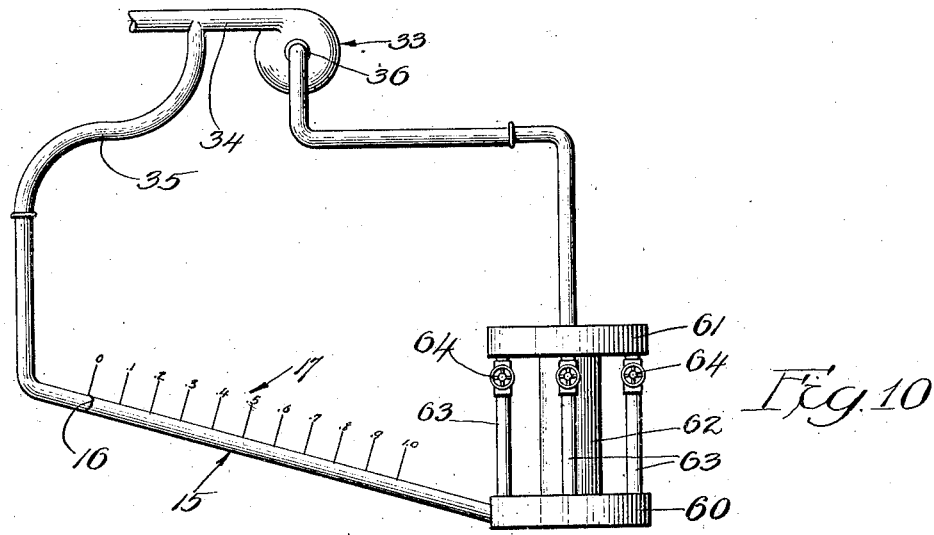
INVENTOR
Arthur H. Anderson
Ralph T. Brackett
BY
ATTORNEY

UNITED STATES PATENT OFFICE.

ARTHUR H. ANDERSON AND RALPH T. BRACKETT, OF CHICAGO, ILLINOIS; SAID ANDERSON ASSIGNOR TO SAID BRACKETT.

DRAFT INSTRUMENT AND THE LIKE.

1,369,314.  Specification of Letters Patent.  Patented Feb. 22, 1921.

Application filed January 11, 1919. Serial No. 270,677.

*To all whom it may concern:*

Be it known that we, ARTHUR H. ANDERSON and RALPH T. BRACKETT, both citizens of the United States, and both residing at Chicago, in the county of Cook and State of Illinois, have invented certain new and useful Improvements in Draft Instruments and the like, of which the following is a specification.

The present invention has to do with certain improvements in draft instruments, that is, instruments for measuring the amount or intensity of draft or difference in gas potential or pressure. Certain of the features of the invention have to do with instruments of this type broadly considered, and without particular reference to their use for specific classes of service. More particularly, however, the features of the invention are very well adapted for use in connection with furnace meters or instruments for measuring or indicating the draft conditions existing within the furnace so as to inform the fireman or other operator as to whether or not said differences are most advantageous for the satisfactory and efficient operation of the furnace. It will be understood, however, that various features of the invention are not limited to this or any other particular class of service or adaptation.

In order that the features of the invention may more readily be understood and the principles of operation better appreciated, we will first explain and describe the said features as applied to draft instruments generally, and will thereafter consider more in detail their application to the particular conditions existing within a furnace meter.

In the ordinary type of draft gage the intensity of the draft is indicated by means of the position of indicating liquid within the gage or tube. The amount of draft or difference in pressure is indicated by the difference in elevation of two surfaces of the liquid, taking account of its specific gravity. The draft is then measured by a comparison of the position of the liquid surfaces with a suitable scale or other measuring device, or by a comparison of two or more of said surfaces with respect to each other. In those cases where a scale is used, the capacity of the instrument is naturally limited or controlled by said scale. At any rate, the total capacity of the instrument is limited by the distance which the indicating surface is permitted to travel over or through the tube whereon the indication is given. The length or size of this tube in turn is limited by the physical dimensions of the instrument itself, which, of course, must be designed to meet the limitations imposed by the location where the instrument is to be used.

If it be assumed, for example, that the physical dimensions of the instrument impose a limitation of one foot in the permissible amount of movement of the indicating surface, then the instrument should be so designed and constructed that with this amount of movement it will indicate throughout the desired range or capacity in draft. It may readily happen that one foot difference in elevation between the liquid surfaces will not be sufficient to take care of the amount of draft which must be measured, and therefore in such cases it will be necessary to so arrange the instrument that the rate at which the difference in elevation changes will be different from the rate at which the indicating surface travels along the indicating tube. In some cases, a converse or opposite condition will be found, namely, one in which the necessary capacity of the instrument measured as a difference in elevation between the surfaces will be much less than the permissible amount of movement of the indicating surface along the indicating tube. In fact, in some cases the change in elevation will be very slight as compared to the permissible amount of indicating movement. In such cases it may become desirable to exaggerate or multiply the movement of the indicating surface as compared to the change in difference in elevations so as to increase or improve the sensitiveness of the instrument and so as to make it possible to accurately measure slight changes of pressure on a scale of substantial size.

One of the objects of the present invention is to provide instruments wherein the amount of movement of the indicating surface or the like may be different from the change in difference of elevation so that the indicating surface will travel faster than the rate of change in difference of elevations or levels. In many cases, it will be found desirable to modify or adjust the ratio which the movement of the indicating surface will bear to the change in elevations, so that the "calibration" of the instrument may be correspondingly modified. This will make it possible to use the same instrument under a wide range of conditions, correspondingly increasing its range of usefulness. In other cases it will be found desirable to change the calibration from time to time, even where the instrument is used at a given location over a long period of time. Whenever the calibration is changed, it is desirable to be able to make such change in definite and known amount, so that the operator can immediately tell the meaning or significance of the new indications following such change. Therefore, another object of the invention is to provide means whereby the exact operating condition or calibration of the instrument can be known from time to time, thus making it possible for the operator to set the instrument so as to operate under certain predicted or anticipated conditions.

Still another feature of the invention has to do with the provision of means whereby the zero point of the instrument can be set at different positions according to the conditions under which the instrument is to be used. In some cases, it may be desirable to use a zero point in the middle of the indicating portion so that the instrument can be used for indications in both directions therefrom, whereas, in other cases, it may be desirable to shift the zero point in one direction or the other from the middle, depending upon whether the range in one direction or the other is to be increased or diminished.

Still another object of the invention is to provide furnace meters or instruments embodying all of the foregoing desirable features as well as others.

Other objects and uses will appear from a detailed description of the invention, which consists in the features of construction and combinations of parts hereinafter described and claimed.

Referring to the drawings:

Fig. 3 shows an instrument similar to Fig. 1, with the exception that the indicating portion thereof includes a horizontal tube and a horizontal scale as distinguished from an inclined tube and scale such as are shown in Fig. 1;

Fig. 4 shows a view similar to Fig. 3, with the exception that the instrument is additionally provided with means for shifting the zero point;

Fig. 5 shows another instrument embodying the features of the present invention and in which the calibration is secured in a slightly different manner;

Fig. 6 shows still another instrument embodying the features of the present invention;

Fig. 7 shows a simple type of furnace meter embodying the features of the present invention;

Fig. 8 shows another type of furnace meter, also embodying the features of the present invention;

Fig. 9 shows another modified form of meter embodying the features of our invention; and Fig. 10 shows still another modified form of such a device.

In order that the features of the invention may be more readily appreciated and understood, we will first state that the calibration or adjustment of the instrument is secured by providing means whereby the cross section of one portion of the instrument as compared to another can be modified or regulated from time to time by the simple expedient of changing the relative inclination of two portions of the instrument with respect to each other, and between which portions the liquid is transferred when changes of pressure take place.

Figure 1:
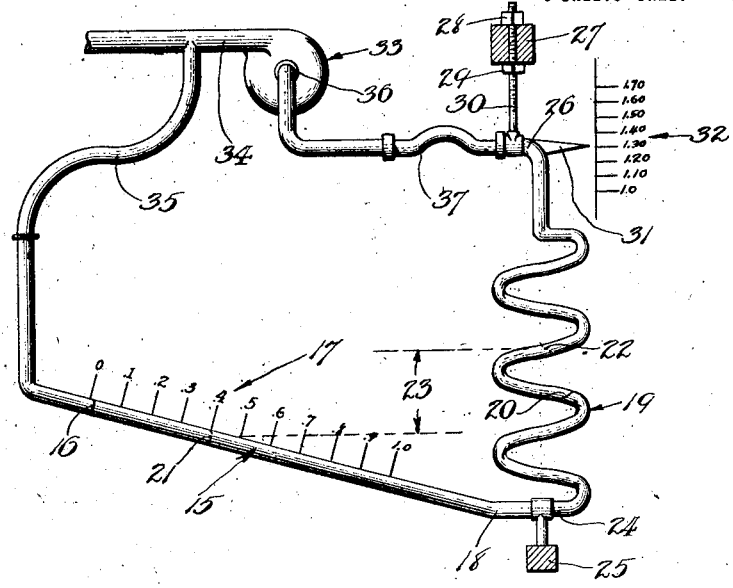
Figure 1 shows a simple type of indicating meter or gage embodying certain features of the present invention. In the construction of Fig. 1 it is possible to change the calibration of the instrument without shifting the zero point.

In the simple type of instrument shown in Fig. 1, there is provided an inclined tube 15, which constitutes the indicating portion of the instrument and within which travels the indicating surface or the like 16. A scale 17 has been illustrated adjacent to the tube 15, so that the movements of the surface 16 may be compared to said scale, but in many cases the use of the scale may be dispensed with and the movement of the surface measured as an absolute amount or compared to some other portion of the instrument or to some other movement. Such scale, when used, may be placed on any suitable background or even, in some cases, on the tube 15 itself.

The lower portion 18 of the indicating tube 15 is connected to the rising arm 19 within which the liquid stands at the point 20 when the difference in pressure between the two arms 15 and 19 is zero. As the pressure in the arm 19 becomes less than that in the arm 15, the surface 16 will move to some new point 21, and the surface in the arm 19 will move to some new point 22, so that the difference in pressure will then be measured by the distance 23 between the new elevations so established.

Assuming that the cross section of the arm 19 is the same as that of the arm 15, the liquid will necessarily travel the same distance through both of said tubes in establishing the new position of balance. At the same time it will be necessary to travel such a distance that the difference in elevation 23 will balance the difference in pressure taking account of the specific gravity of the liquid which it will be assumed is constant. In order to establish a given difference in elevation 23, the distance which the liquid must travel through the tubes will depend upon the slope of the arm 15 and upon the slope of the tube in the arm 19. Since the slope of the arm 15 is constant, the controlling factor will be the slope of the arm 19. By changing this slope, as by either compressing or elongating the spiral, it will be possible to change the distance which the liquid will have to travel through the tubes in order to establish a given difference in elevation 23. For example, if the spiral or sloping arm 19 should be compressed, so that a given distance of travel through the tubes would represent a smaller change of elevation, it will become necessary for the liquid to travel a greater distance through the tubes in order to establish a given amount of difference in elevation than would otherwise be necessary.

In order to make it possible to thus change the calibration, we have provided means for changing the slope of the one arm as compared with the other. In the particular form shown in Fig. 1, this is done by either compressing or elongating the spiral or sloping arm 19. For this purpose the lower end 24 of said arm is anchored to a stationary part 25, whereas the upper end 26 may be raised and lowered with respect to a stationary part 27. This may be accomplished by a pair of nuts 28 and 29 on a threaded pin or the like 30 connected to the upper end 26. A pointer 31 is illustrated on the upper end 26, the same working over a scale 32 so as to give a convenient indication as to the factor by which the indication on the scale 17 should be multiplied in order to ascertain the true or absolute meaning of a given indication on the scale 17. Such scale 32, when used, may be placed on any suitable background, or on any suitable portion of the instrument. By raising the upper end 26 of the arm 19, the distance which the liquid will rise or fall for a given movement through the tubes will be increased, and, therefore, the reading on the scale 32 will be correspondingly increased.

As a matter of convenience, in order to show the operation of the device, a blower or the like 33, is illustrated, the same having its discharge end 34 connected to the arm 15 by means of a tube or pipe 35, and its intake 36 connected to the upper end of the arm 19 by means of a flexible connection 37.

It will be observed that when the calibration of the instrument is changed, the zero point or the location of the surface 16 for a balanced pressure on the arms will be shifted. Consequently, it is desirable to be able to restore the conditions of indication so that zero will be indicated at such time. This may be done by shifting the scale itself to a new location, or by changing the volume of liquid contained in the two arms of the instrument. The latter result can be accomplished in either of several ways, but a simple arrangement is that illustrated in Fig. 2, which comprises a diaphragm member 39 having its interior connected to the tubes by a connection 40. A pair of units 41 and 42 on a pin 43 serve to expand or contract the diaphragm by operating against a fixed stop 44, the lower end of the tubular arm 19 being inclosed at the point 45.

In the construction of this figure, means are provided for adjusting the upper portion of the arm 19 in a vertical direction in a manner similar to the arrangement shown in Fig. 1, so that the calibration of the instrument can be adjusted. It is to be observed that when the calibration is adjusted so as to thereby change the rate of movement along the scale 17 for a given rate of change in pressure, the zero point of the instrument will also be shifted, so that when the difference in pressure is zero the surface 16 will not stand at the zero position on the scale unless the scale itself be shifted, or unless some other expedient such as that previously described be provided for reëstablishing or setting the zero point. Therefore, we also contemplate within the scope of our invention means for actually shifting the scale 17 itself so as to bring its zero point to the desired position, as well as means for causing a shifting of the liquid for this purpose.

Referring to Fig. 3, we have therein illustrated another form of instrument embodying the features of the present invention, in which the left hand arm 15 extends in a horizontal direction, and in which the means for compressing or extending the arm 19 has been modified. In our copending application for Letters Patent of the United States on improvements in draft instruments, furnace meters and the like, Serial No. 268886, executed December 17, 1918, we have disclosed certain forms of instruments in which one of the arms of the gage may be located or mounted in a horizontal direction, and the instrument in Fig. 3 embodies to that extent the features disclosed in the aforesaid previously filed application.

In the construction of Fig. 3, the upper and lower portions 26 and 24 of the arm 19 are joined together by an adjustment device comprising a pair of internally threaded sleeves 46 and 47, the threads of which are of contrary nature, a doubly threaded pin 48 having its end portions threaded into said sleeves. By rotating the pin 48 in the one direction or the other, the arm 19 will be either compressed or expanded. This may be done as by the use of a screw driver in the slot 49 passed down through the upper end of the sleeve 46, or by a wrench applied to the middle portion of the pin 48. In the former case, wax or cement 50 may be poured into the upper end of the sleeve 46 after the instrument has been adjusted, so as to seal the same and make it impossible to change the calibration or adjustment except by breaking the seal.

Figure 2:
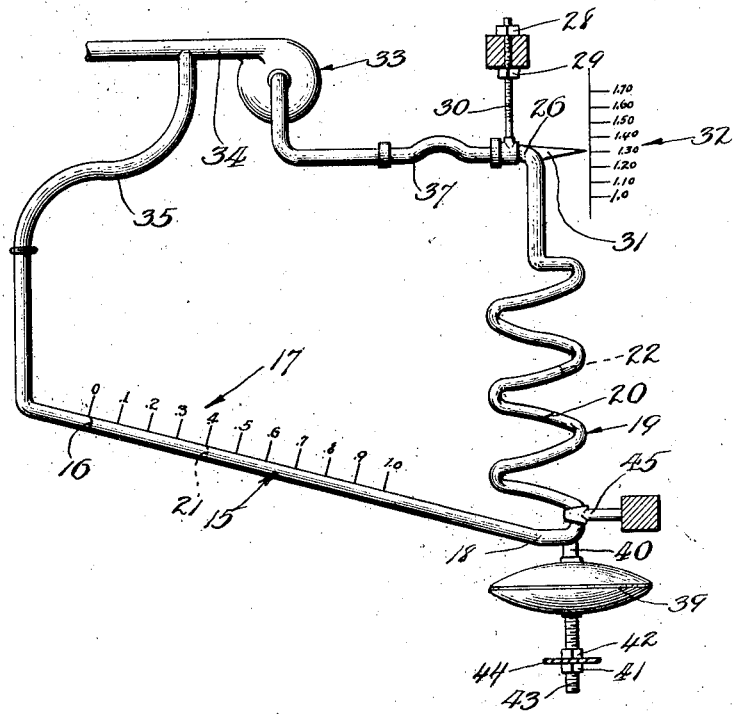
Fig. 2 shows an instrument corresponding to Fig. 1, with the exception that it is additionally provided with means for shifting the zero point.

The construction shown in Fig. 4 is similar to that of Fig. 2, with the exception that the arm 15 in Fig. 4 is shown as extending in a horizontal direction, so that the instrument to that extent embodies the features disclosed in the aforesaid previously filed application.

In Fig. 5 we have shown another modified form of instrument, in which the rising arm 19 is movable with respect to the horizontal arm 15, so that its slope may be correspondingly adjusted. For this purpose the lower end 51 is held stationary, while the arm itself is tilted back and forth until a position is reached such as that indicated by the dotted lines 52, in which the slope is such as to give the desired or correct calibration. This tilting or change in slope may be accomplished as by the use of a segment 53 drawn on an arc about the point 51 as a center and working through a fixed or stationary locking device 54 having a locking screw 55. A scale may be marked on the segment 53 so that the calibration of the instrument will be indicated at all times.

In the construction shown in Fig. 6, there are provided, in conjunction with the arm 15, two rising arms 19 and 19ª, the former of which may be adjusted in manner similar to that explained in reference to Fig. 5, and the latter of which is of fixed position, ordinarily vertical. The upper ends of both of these arms are connected to the device whose pressure is being measured, so that they are both subjected to the same pressure. Consequently, the level of the liquid in both of them will be the same. By shifting the arm 19 the calibration of the instrument will be adjusted or modified, and the presence of the stationary arm 19ª makes it possible to conveniently readjust or set the zero point, notwithstanding the changed position of the arm 19. Such readjustment of the zero point may be accomplished through the upper end 56 of the arm 19ª, the same being in alinement with the arm 19ª itself, so that a dropper or the like can be set down into the arm 19ª to either introduce or withdraw the proper amount of liquid. Thereafter, said upper end 56 may be closed by the use of a cap or the like 57.

In Figs. 7 and 8 we have illustrated two simple types of furnace meter, both of which embody the features of the present invention. These furnace meters also embody the features of the invention disclosed in our co-pending application for Letters Patent of the United States for improvements in furnace meters and the like, Serial No. 263,683, filed November 22, 1918. In each of the instruments shown in Figs. 7 and 8 there are provided two gages or indicators 58 and 59, located in such relationship to each other or to a scale with which they may be compared that it is possible to effect a comparison between their readings, which will indicate to the operator or furnace man whether or not the furnace is being operated under the most advantageous conditions, and if not so operated what changes or adjustments should best be made in order to restore the most favorable conditions of operation. In the constructions of Figs. 7 and 8, we have illustrated in such meters the application of certain of the adjustment or calibration features hereinbefore disclosed, thereby making it possible to calibrate or adjust the gages or indicators of these furnace meters from time to time so as to bring them into the proper relative readings.

In Fig. 9 we have disclosed another form of meter embodying the features of our present invention, in which the rising arm 19 is formed as a conical helix so that its upper end 58 may be forced clear down to a level or elevation as low as the fixed point 59. It is to be observed in this connection that in such forms as those of Figs. 1 and 2 the amount of compression or closing of the spiral or rising arm is limited by the position at which the bends of the arm come together. No such limitations is present in the construction shown in Fig. 9.

In the construction shown in Fig 10, the arm 19 comprises a series of vertical tubes having their lower ends connected into a common manifold 60, and their upper ends into a common manifold 61 Ordinarily, a single relatively large central tube 62 will be used in conjunction with a series of smaller tubes 63. A valve 64 located in each of the tubes 63 makes it possible to cut off or shut off one or more of said tubes so as to render the same ineffective. The total effective cross section of the arm 19 will be measured as the total cross section of the tubes 62 and 63, which are open, and it is therefore a very simple matter to adjust the calibration by opening or closing one or more of the valves 64.

We claim:

1. A draft instrument comprising a pair of connected tubular arms, one of which is a fixed indicating arm and the other of which extends upwardly with respect to the connected end of the indicating arm, a suitable fixed scale adjacent to the indicating arm and in position for comparison of the liquid surface of the indicating arm therewith, indicating liquid in both of the arms, the upwardly extending arm having its bore lying at an angle to the vertical, means for varying said angle while maintaining the indicating arm in fixed position with respect to the vertical, and means in conjunction with said varying means for showing the effect of such variation on the indication given by the indicating arm, substantially as described.

2. A draft instrument comprising a pair of tubular arms, one of which is a fixed indicating arm and the other of which extends upwardly with respect to the indicating arm, the lower portion of said upwardly extending arm being connected to the indicating arm, indicating liquid in both of the arms, means for varying the inclination of the upwardly extending arm, and means for showing the effect of such variation on the indication given by the indicating arm, substantially as described.

3. A draft instrument comprising a pair of tubular arms lying at an angle to each other, one of said arms extending upwardly at an angle to the horizontal, means for varying said angle, while maintaining the angle of the other arm fixed in amount, means for showing the effect of such variation on the indication given by the indicating arm, and indicating liquid in both of the arms, substantially as described.

4. A draft instrument comprising a pair of tubular arms, lying at an angle to each other and connected together in their lower end portions, one of said arms extending upwardly with respect to the horizontal, means for varying the angle of inclination of said arm, and means for varying the volume of the connection between the two arms while maintaining the arm stationary, substantially as described.

5. A draft instrument comprising a pair of tubular arms lying at an angle to each other, one of said arms extending upwardly with respect to the horizontal, and means for varying the amount of inclination of said arm while maintaining the other arm fixed in position, substantially as described.

6. A draft instrument comprising a pair of tubular arms lying at an angle to each other, one of said arms extending upwardly with respect to the horizontal, means for varying the inclination of said arm, a connection between the lower ends of the arms, and means for varying the volume of said connection while maintaining the arms stationary, substantially as described.

ARTHUR H. ANDERSON.
RALPH T. BRACKETT.